Patented Dec. 14, 1937

2,102,219

UNITED STATES PATENT OFFICE 2,102,219

WATER SOFTENING COMPOUND

Sidney A. Raymond, Green Bay, Wis.

No Drawing. Application November 10, 1936,
Serial No. 110,185

4 Claims. (Cl. 210—23)

This invention relates to improvements in compounds for softening water and pertains more particularly to a compound suitable for use in softening water for domestic use, altho it may be used in connection with water used in boilers or other commercial enterprises.

The primary object of the present invention is to provide an improved water softening compound which will assume a solid condition after the several ingredients thereof have been mixed together so that the water to be softened thereby may be flowed over the body of the compound and be made to fully contact the chemicals thereof so that all organic matter together with the lime and other metallic salts which give water its so-called hard condition, will be precipitated.

Another object of the invention is to provide a composition of a novel character whereby it will not be easily washed away by the water coming in contact therewith and also whereby a heavy chemical constituent will be maintained in a distributed or dispersed condition through the compound instead of settling to the bottom as it would do if the compound were in liquid or semi-liquid form.

The invention broadly contemplates the use in combination of tri-sodium phosphate, borax, an alum, preferably soda alum and sodium aluminate.

In preparing the composition twenty pounds of tri-sodium phosphate is mixed with three pounds of sodium borate or borax and three pounds of the alum selected. The chemicals are thoroughly ground up to reduce any lumps which may be present and are thoroughly mixed together, and there is then added six quarts of pure water. This water solution is then boiled for a period of approximately three minutes, the boiling being kept at a low point or what is known as a rolling or bubbling boil.

Following the boiling of the mixed chemicals, there is then added to the liquid while the same is hot, one pint of sodium aluminate in the form of a 33⅓% aqueous solution and after thoroughly mixing the same with the other ingredients the composition is transferred to the container in which it is to remain during its use as a water softener.

The container is left open for a period of one hour or so, and the composition upon cooling will assume a solid form.

The amounts of the chemicals used, as above set forth, are given merely as an illustration of the desired proportions, and it will, of course, be obvious that these quantities may be increased or diminished proportionately as required to make a larger or smaller batch of the compound.

While it is possible to employ other alums such as potash alum or ammonia alum, in the present composition it is preferred to use soda alum or sodium aluminum sulphate as this particular alum has been found to give superior results.

The particular advantages in the use of a solid water softening composition of the character set forth will be readily apparent. In the solid, all of the chemicals are suspended uniformly throughout the solid mass, whereas in liquid or semi-liquid softening compositions, the heavier chemicals such as sodium aluminate, would sink to the bottom of the container and thus the hard water which is introduced into the container at the top, cannot receive uniform treatment by the softening agent. At times it is likely that the water could not come into contact with the sodium aluminate at all in a liquid water treating composition.

In the present invention the water comes into contact with all of the chemicals because of their having been united in the solid mass, with the result that the hard water receives uniform treatment. The water will be conducted into the container for the compound through the top and will penetrate the solid compound to a depth of one quarter of an inch. This solid compound will gradually wear away uniformly until it is entirely used up.

Another advantage in the formation of the water softening composition in the solid form set forth, is that the strength of the agent is not diminished by constant use as it would be if the composition were a liquid.

What is claimed, is:

1. The improved water softening compound consisting of tri-sodium phosphate, sodium aluminate, borax, and an alum.

2. The improved water softening compound consisting of tri-sodium phosphate, borax, sodium aluminum sulphate, and sodium aluminate.

3. An improved water softening compound and process of making the same which consists in mixing together twenty pounds of tri-sodium phosphate, three pounds of borax, three pounds of an alum and six quarts of pure water, boiling the mixture, and adding thereto while hot one pint of a 33⅓% aqueous solution of sodium aluminate and allowing the mixture to set to a solid consistency before use.

4. The improved water softening composition which consists essentially of a solid body formed of borax, an alum and sodium aluminate, and a water softening chemical.

SIDNEY A. RAYMOND.